(12) United States Patent
Miller

(10) Patent No.: US 7,738,651 B2
(45) Date of Patent: Jun. 15, 2010

(54) METHOD AND APPARATUS FOR CUSTOMIZING AN AUDIO FILE IN A MOBILE DEVICE

(75) Inventor: Douglas Miller, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1276 days.

(21) Appl. No.: 11/252,152

(22) Filed: Oct. 17, 2005

(65) Prior Publication Data

US 2007/0116205 A1 May 24, 2007

(51) Int. Cl.
*H04M 3/00* (2006.01)
(52) U.S. Cl. .............. 379/373.03; 455/567; 379/374.01
(58) Field of Classification Search ................ 455/567, 455/415; 379/373.01, 373.02, 373.03, 373.04, 379/374.01, 374.02, 375.01
See application file for complete search history.

(56) References Cited

U.S. PATENT DOCUMENTS 6,496,692 B1 * 12/2002 Shanahan ................ 455/418
7,450,971 B2 * 11/2008 Futohashi ................. 455/567
2005/0070241 A1 3/2005 Northcutt et al.
2005/0170865 A1 * 8/2005 Harvej et al. ............. 455/567
2006/0030372 A1 * 2/2006 Jeong ...................... 455/567

FOREIGN PATENT DOCUMENTS

| EP | 1391872 | 2/2004 |
|---|---|---|
| EP | 1624653 | 2/2006 |
| WO | 2005/024827 | 3/2005 |

OTHER PUBLICATIONS

PCT International Search Report, International Application No. PCT/US2006/022547, Mailed Sep. 14, 2006.

* cited by examiner

*Primary Examiner*—Olisa Anwah
(74) *Attorney, Agent, or Firm*—Coats & Bennett, P.L.L.C.

(57) ABSTRACT

A method and an apparatus for customizing an audio file, such as a ring tone stored in a mobile device is described herein. In particular, a mobile device according to the present invention includes an audio utility and an audio processor. The audio utility stores one or more pointers associated with a stored audio file. Each pointer identifies a specific user-selected start position for the audio file. Whenever the audio processor plays the audio file, the audio processor plays the audio file from the start position identified by one of the user-selected pointers.

26 Claims, 5 Drawing Sheets

METHOD AND APPARATUS FOR CUSTOMIZING AN AUDIO FILE IN A MOBILE DEVICE

BACKGROUND

This invention relates generally to audio files for a mobile device, and more particularly to customizing a ring tone for the wireless communication device.

An increasing number of mobile devices have multi-media features that enable a user to listen to music, watch video clips, program ring tones, etc. Ring tones enable a user to personalize the notification system used by, a mobile device, i.e., a wireless communication device, to notify the user of an incoming call, message, etc. For example, the wireless communication device notifies the user of an incoming call by playing a user-selected ring tone.

While conventional multi-media devices continue to expand the options associated with ring tone features, conventional ring tones still have some drawbacks. For example, whenever a ring tone is accessed, the mobile device plays the ring tone from the beginning of the stored ring tone file associated with the ring tone. As such, each time a ring tone is played, the user hears the same section of the ring tone, which typically corresponds to a beginning of a song. Currently, the only way to change the starting position of a ring tone is to edit the ring tone file on an external computer to remove a beginning portion of the ring tone, and therefore, to move the desired start position to the beginning of the ring tone file. By storing the edited ring tone in the wireless communication device, the user forces the wireless communication device to play the ring tone from a desired start position. However, any time the user wishes to change the start position of the ring tone, the user must repeat this cumbersome editing process.

SUMMARY

The present invention provides a method and an apparatus for customizing an audio file, such as a ring tone, for a mobile device. In particular, a mobile device according to the present invention includes an audio utility and an audio processor. The audio utility generates and stores a set of one or more pointers for a stored audio file. Each pointer identifies a specific user-selected start position for the audio file. Whenever the audio processor plays the audio file, the audio processor plays the audio file from the start position identified by one of the user-selected pointers.

In one embodiment, the audio utility generates the set of pointers while in a pointer identification mode. During the pointer identification mode, the audio processor plays a substantial portion of the audio file. While the audio processor plays the audio file, the audio utility generates one or more time markers responsive to user input, wherein each time marker corresponds to a different start position for the audio file relative to the beginning of the audio file. The audio utility then generates the set of pointers based on the one or more time markers.

DETAILED DESCRIPTION

Figure 1:
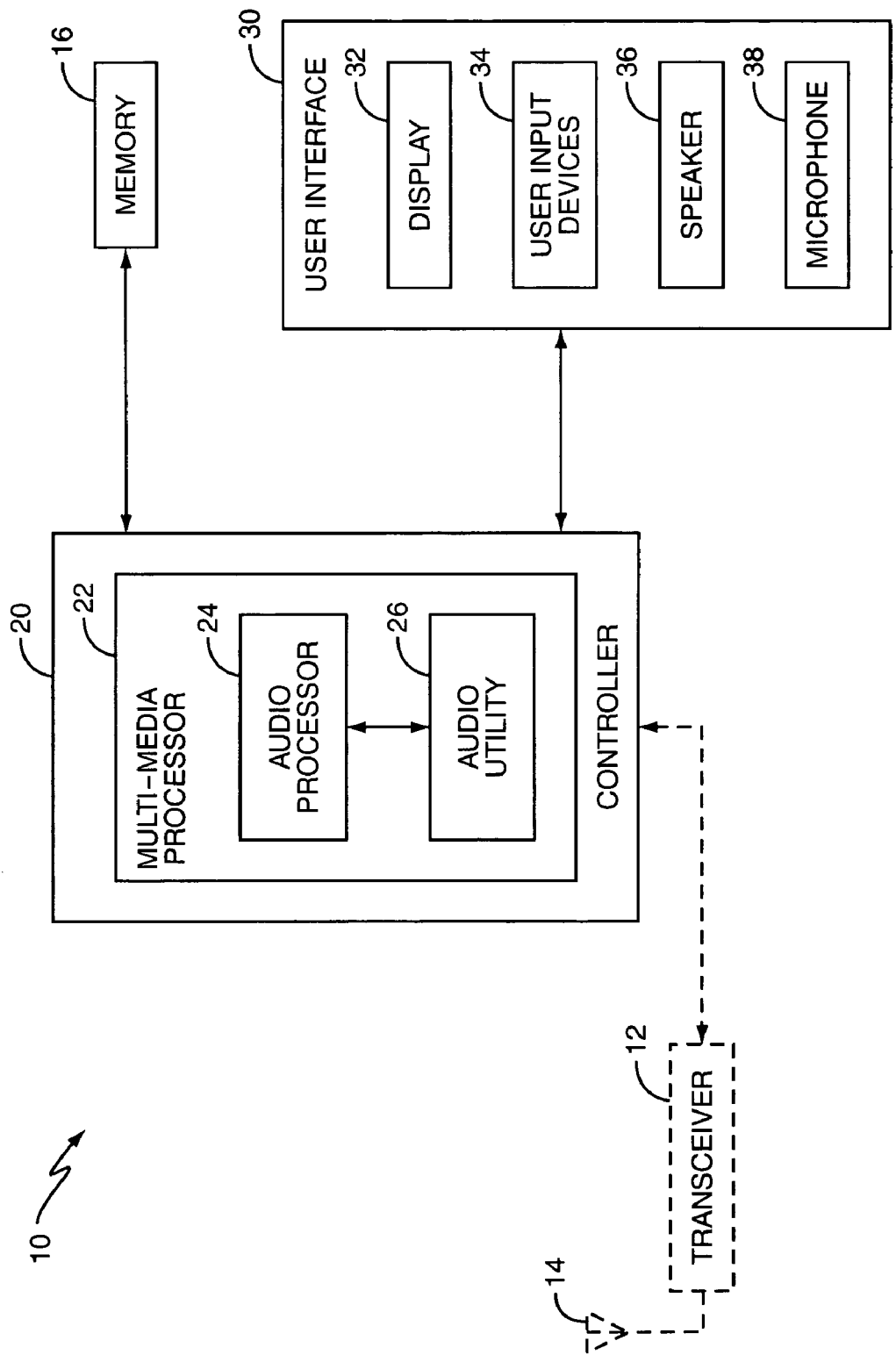
FIG. 1 illustrates a block diagram of a mobile device according to an embodiment of the present invention.

FIG. 1 illustrates a block diagram of an exemplary mobile device 10 according to the present invention. According to the present invention, mobile device 10 may comprise any known portable multi-media electronic device, including but not limited to, a portable music player or a wireless communication device, such as a cellular telephone, pager, personal data assistant, etc.

Mobile device 10 includes memory 16, controller 20, and user interface 30. Controller 20 controls the overall operation of mobile device 10 according to programs stored in memory 16. The control functions may be implemented in a single processor, or in multiple processors. Suitable processors may include general purpose microprocessors, microcontrollers, digital signal processors, hardware, firmware, or a combination thereof. Memory 16 represents the entire hierarchy of memory in the mobile station 10, and may include both random access memory (RAM) and read-only memory (ROM). Computer programs and data required for operation are stored in non-volatile memory, such as EPROM, EEPROM, and/or flash memory, which may be implemented as discrete devices, stacked devices, or may be integrated with one or more processors.

User interface 30 enables a user to interact with and control the mobile device 10 and includes a display 32, one or more user input devices 34, a speaker 36, and a microphone 38. Display 32 may comprise a liquid crystal display (LCD) to enable the user to view menus and other information. The user input devices 34 may comprise any known computer input devices, such as keypads, touch pads, joystick controls, scroll wheels, and buttons that allow a user to input data and commands. A voice recognition system or touch screen display screen display may also be used for user input. Speaker 36 converts analog audio signals into audible signals that can be heard by the user. Microphone 38 converts the detected speech and other audible signals into electrical audio signals for input to the controller 20.

When mobile device 10 comprises a wireless communication device, the mobile device 10 further includes a transceiver 12 and antenna system 14. Transceiver 12 receives and transmits signals via antenna 14. The transceiver 12 is a fully functional cellular radio transceiver, which may operate according to any known wireless communication standard, including the standards known generally as the Global System for Mobile Communications (GSM), TIA/EIA-136, cdmaOne, cdma2000, UMTS, and Wideband CDMA.

According to the present invention, mobile device 10 plays audio files responsive to various mobile device events. To that end, controller 20 includes a multi-media processor 22 that includes an audio processor 24. Audio processor 24 plays an audio file responsive to one or more different mobile device events. For example, responsive to an alarm, audio processor 24 may play an audio file stored in memory 16 to alert the user of the alarm. Alternatively, the audio processor 24 may play an audio file, such as a ring tone, responsive to a wireless communication event to alert the user of an incoming call, text message, email message, voice mail, etc. Conventional audio processors 24 play the audio file from the beginning of the stored audio file.

To customize a stored audio file, the multi-media processor of the present invention also includes an audio utility 26. Responsive to user input, audio utility 26 generates and stores a set of one or more pointers that correspond to an audio file stored in memory 16. Each pointer identifies a different start position within the stored audio file. According to the present invention, the audio processor 24 plays the stored audio file from the start position identified by one of the pointers in the set of pointers each time the audio processor plays 24 the audio file.

Figure 2:
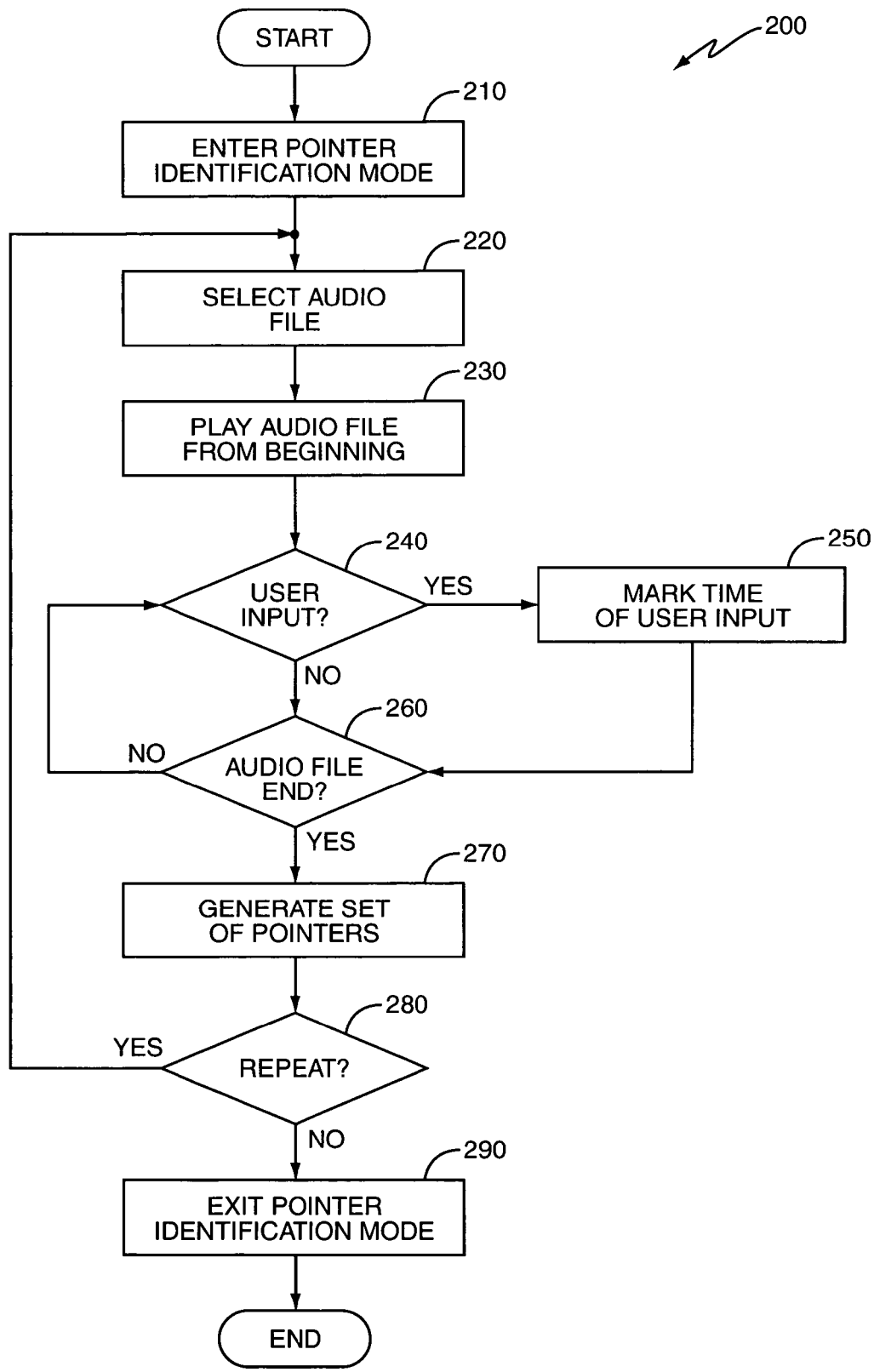
FIG. 2 illustrates a flow chart for a programming process for one embodiment of the present invention.

FIG. 2 illustrates an exemplary procedure for generating one or more sets of pointers using audio utility 26. After the mobile device 10 enters a pointer identification mode (block 210), the user selects one of the audio files stored in memory 16 (block 220). The user may provide the input using any one of the user input devices 34 and/or by providing audio commands to microphone 38. Audio processor 24 then plays a substantial portion of the selected audio file, and preferably plays the selected audio file from a beginning of the stored audio file (block 230). Each time the user provides input (block 240), audio utility 26 marks the time that the user input occurred relative to the beginning of the audio file (block 250). In the example illustrated by FIG. 3, the user provides input at times $t_1$, $t_2$, $t_3$, and $t_4$. When the audio file ends (block 260), audio utility 26 generates a set of pointers P={$P_1$, $P_2$, $P_3$, $P_4$} based on the generated time markers (block 270) and stores the generated set of pointers in the audio utility 26. The user may generate another set of pointers for one or more additional audio files (block 280) by repeating the process associated with blocks 220-270. After the user is finished, the mobile device 10 exits the pointer identification mode (block 290). While the above describes programming the audio utility, it will be appreciated that the same process may be used to edit an existing set of pointers.

Figure 3:
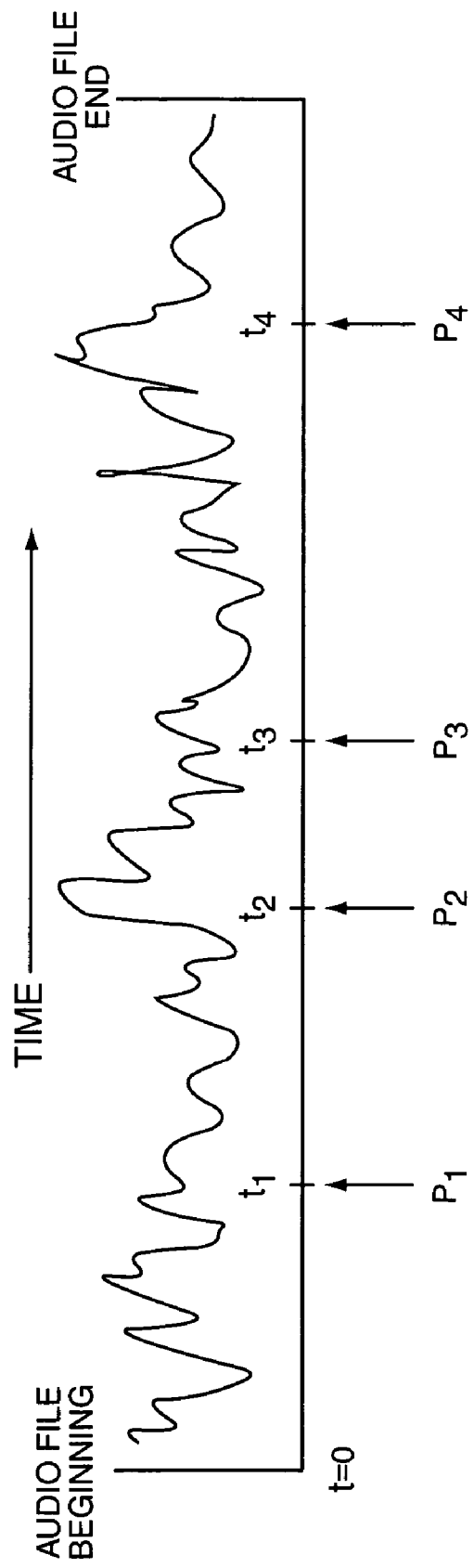
FIG. 3 plots an exemplary audio file relative to time.
Figure 4:
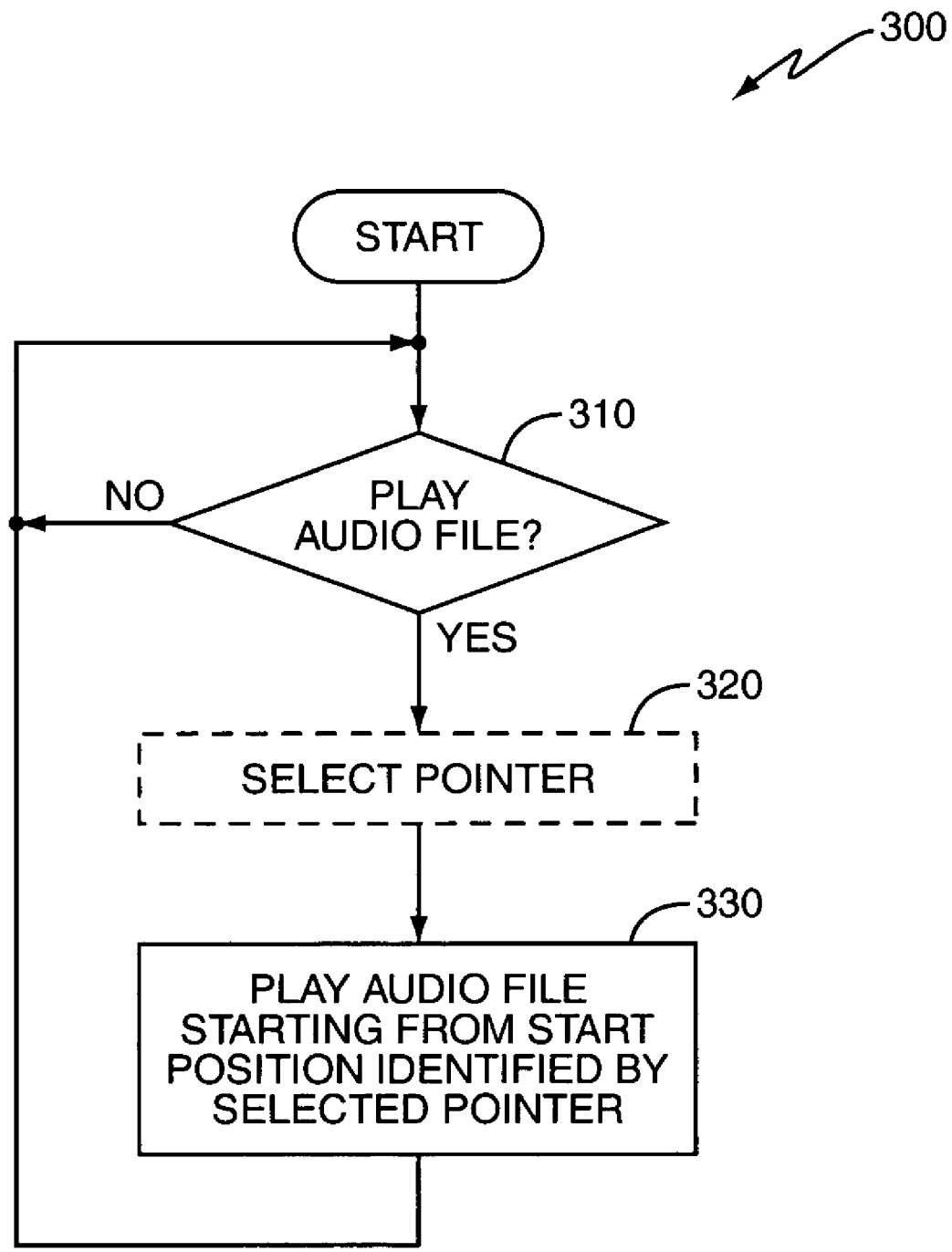
FIG. 4 illustrates a flow chart for an exemplary playback process for one embodiment of the present invention.

Once the user programs the audio utility 26 with a set of pointers for at least one audio file, the mobile device 10 implements the process illustrated in FIG. 4 each time the audio processor 24 plays an audio file. As shown in FIG. 3, when the audio processor 24 is ready to play an audio file (block 310), the audio processor 24 plays a selected audio file from a start position identified by a selected pointer (blocks 320 and 330). While FIG. 4 illustrates a specific step for actively selecting the pointer (block 320), the present invention does not require a separate selection process (block 320). For example, when the set of pointers includes a single pointer, no selection process is required.

Figure 5:
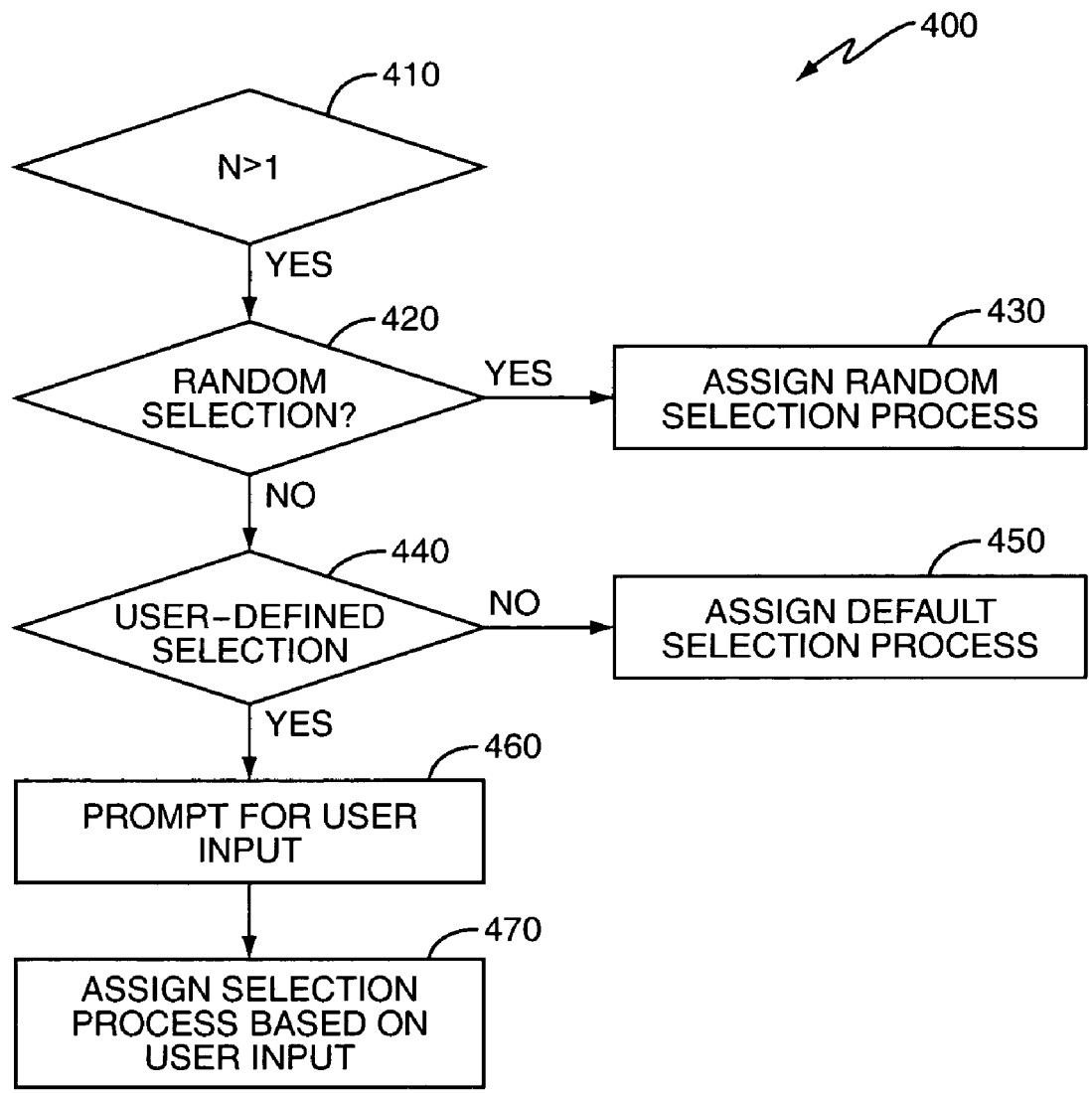
FIG. 5 illustrates a flow chart for an exemplary pointer selection process for one embodiment of the present invention.

When the exemplary process includes a specific pointer selection process, audio utility 26 may implement a pointer selection process chosen during the pointer identification mode. For example, as shown in FIG. 5, during the pointer identification mode, the audio utility 26 may prompt the user to choose a pointer selection process 400. When the set of pointers includes n pointers, and when n>1 (block 410), the audio utility 26 prompts the user to choose a selection process. If the user chooses a random selection process (block 420), the audio utility 26 assigns a random selection process to the set of pointers (block 430). Accordingly, each time the audio processor 24 plays the audio file, the audio processor 24 plays the audio file from a start position identified by a randomly selected pointer.

If the user does not choose a random selection process (block 420), but instead chooses a user-defined selection process (block 440), the audio utility 26 prompts the user for input (block 460). Based on this user input, the audio utility 26 generates and assigns a user-defined pointer selection process to the generated set of pointers (block 470). In one embodiment, the user input identifies one of the pointers in the set of pointers as a primary pointer. When audio utility 26 applies this selection process to the generated set of pointers, the audio processor 24 plays the audio file from a start position identified by the user-selected primary pointer each time the audio processor 24 plays the audio file.

According to yet another embodiment, the user input assigns a priority order to the set of pointers. For example, the user may rank the pointers shown in FIG. 3 according to the following order: $P_2$, $P_1$, $P_4$, and $P_3$. For this embodiment, audio processor 24 plays the audio file from the start position identified by the second pointer ($P_2$) the first time the audio processor 24 plays the file. Each subsequent time, the audio processor 24 plays the audio file from the start position identified by the first, fourth, and third pointers, respectively. The fifth time the audio processor 24 plays the audio file, the start position returns to the time identified by the second pointer.

In still another embodiment, the user input assigns different pointers to different mobile device operating modes, such as a call mode, email mode, text message mode, voice mail mode, alarm clock mode, etc. For example, the user may assign the first pointer ($P_1$) to the call mode, the second pointer ($P_2$) to the email mode, the third pointer ($P_3$) to the text message mode, and the fourth pointer ($P_4$) to the alarm clock mode. As a result, when the mobile device 10 receives notification of a call, audio processor 24 notifies the user of the incoming call by playing the audio file from the start position identified by $P_1$. Similarly, audio processor 24 notifies the user of an incoming email, an incoming text message, and an alarm by playing the audio file from the start position identified by $P_2$, $P_3$, and $P_4$, respectively.

According to another embodiment, the user input assigns different pointers to different personal contacts. For example, the user may assign the first pointer ($P_1$) to "Sally," the second pointer ($P_2$) to Mom, etc. When the mobile device 10 receives notification of a call from "Sally," audio processor 24 notifies the user of the incoming call by playing the audio file from the start position identified by $P_1$.

If the user also does not choose the user-defined selection process (block 274), the audio utility 26 assigns a default selection process (block 275). For example, the audio utility 26 may automatically identify the first pointer in the set of pointers as the primary pointer to be used by the audio processor 24 each time the audio processor 24 plays the selected audio file.

The above discusses playing a selected audio file from a start position identified by a user-selected pointer. While not explicitly discussed herein, it will be appreciated that audio processor 24 may select the audio file according to any known process. For example, the user may assign a different audio file to different operating modes. Alternatively, the user may select a random mode that randomly selects an audio file each time the audio processor 24 plays an audio file.

The above-described customization process and apparatus has many advantages over the prior art. First, by implementing the customizing process discussed above, users can quickly create and/or edit a set of pointers that identify different starting positions for a selected audio file. As a result, the user does not have to step through the cumbersome audio file editing process required for conventional mobile devices. Further, using the above-described process, the user can identify multiple different starting positions for a single audio file. Because conventional mobile devices would require a separate audio file for each different starting position, the present invention provides significant memory savings.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

I claim:

1. A method of customizing an audio file for a mobile device, the method comprising:
storing a set of one or more pointers corresponding to one or more user-selected start positions for the audio file;
organizing the one or more pointers in the set of pointers according to a user-defined order;
selecting a different pointer from the set of pointers as a current pointer based on the user-defined order each time the mobile device plays the audio file; and
playing the audio file from a start position identified by the current pointer each time the mobile device plays the audio file.

2. The method of claim 1 further comprising:
entering a pointer-selection mode;
playing a substantial portion of the audio file during the pointer identification mode;
generating one or more time markers responsive to user input received while playing of the audio file during the pointer identification mode; and
generating the set of pointers based on the one or more time markers.

3. The method of claim 1 wherein storing a set of one or more pointers comprises storing a set of one or more pointers for each of one or more audio files.

4. The method of claim 1 wherein the audio file comprises an MP3 file.

5. The method of claim 1 wherein the audio file comprises a ring tone.

6. The method of claim 1 wherein the mobile device comprises a wireless communication device.

7. A method of customizing an audio file for a mobile device, the method comprising:
storing a set of one or more pointers corresponding to one or more user-selected start positions for the audio file, wherein each pointer in the set of pointers corresponds to a mobile device operating mode;
selecting one of the pointers from the set of pointers as a current pointer based on a current mobile device operating mode each time the mobile device plays the audio file; and
playing the audio file from a start position identified by the current pointer each time the mobile device plays the audio file.

8. The method of claim 7 wherein the mobile device operating mode comprises one of a call mode, an email mode, a voice mail mode, an alarm mode, and a text messaging mode.

9. A mobile device comprising:
a memory configured to store an audio file; and
a multi-media processor comprising:
an audio utility configured to
store a set of one or more pointers corresponding to one or more user-selected start positions for the audio file;
organize the one or more pointers in the set according to a user-defined order; and
select a different pointer from the set of pointers based on the user-defined order each time the mobile device plays the audio file; and
an audio processor configured to play the audio file from a start position identified by the current pointer each time the mobile device plays the audio file.

10. The mobile device of claim 9 wherein the audio processor is configured to play a substantial portion of the audio file during a pointer identification mode, and wherein the audio utility is further configured to:
generate one or more time markers responsive to user input received while the audio processor plays the audio file during the pointer identification mode; and
generate the set of pointers based on the one or more time markers.

11. The mobile device of claim 9 wherein the memory is configured to store a plurality of audio files, and wherein the audio utility is configured to store a set of one or more pointers for each stored audio file.

12. The mobile device of claim 9 wherein the audio file comprises an MP3 file.

13. The mobile device of claim 9 wherein the audio file comprises a ring tone.

14. The mobile device of claim 9 wherein the mobile device comprises a wireless communication device.

15. A mobile device comprising:
a memory configured to store an audio file; and
a multi-media processor comprising:
an audio utility configured to:
store a set of one or more pointers corresponding to one or more user-selected start positions for the audio file, wherein each pointer in the set of pointers corresponds to a mobile device operating mode; and
select one of the pointers from the set of pointers as a current pointer based on a current mobile device operating mode each time the mobile device plays the audio file; and
an audio processor configured to play the audio file from a start position identified by the current pointer each time the mobile device plays the audio file.

16. The mobile device of claim 15 wherein the mobile device operating mode comprises one of a call mode, an email mode, a voice mail mode, an alarm mode and a text messaging mode.

17. A method of customizing an audio file for a mobile device, the method comprising:
during a pointer identification mode, playing a substantial portion of the audio file;
generating one or more time markers responsive to user input received while playing the audio file during the pointer identification mode, wherein each time marker corresponds to a different start position for the audio file;
generating a set of one or more pointers based on the one or more time markers;
organizing the one or more pointers according to a user-defined order;
exiting the pointer identification mode;
selecting a different pointer as a current pointer based on the user-defined order each time the mobile device plays the audio file; and
playing the audio file from a start position identified by the current pointer each time the audio processor plays the audio file.

18. The method of claim 17 further comprising editing the generated set of pointers responsive to user input.

19. The method of claim 17 wherein the audio file comprises a ring tone.

20. The method of claim 17 wherein the mobile device comprises a wireless communication device.

21. A mobile device comprising:
a memory configured to store an audio file; and
a multi-media processor comprising:

an audio processor configured to play a substantial portion of the audio file during a pointer identification mode; and an audio utility configured to generate one or more time markers responsive to user input received while the audio processor plays the audio file during the pointer identification mode and to organize the one or more pointers according to a user-defined order, wherein each time marker corresponds to a different start position for the audio file, and to generate a set of one or more pointers based on the one or more time markers;

wherein after exiting the pointer identification mode, the audio processor is further configured to:

select a different pointer as a current pointer based on the user-defined order each time the mobile device plays the audio file; and play the audio file from the current pointer each time the audio processor plays the audio file.

22. The mobile device of claim 21 wherein the audio utility is further configured to edit the generated set of pointers responsive to user input.

23. The mobile device of claim 21 wherein the audio file comprises a ring tone.

24. The mobile device of claim 21 wherein the mobile, device comprises a wireless communication device.

25. A method of customizing an audio file for a mobile device, the method comprising:

storing a set of one or more pointers corresponding to one or more user-selected start positions for the audio file;

randomly selecting one of the pointers from the set of pointers as a current pointer each time the mobile device plays the audio file; and playing the audio file from a start position identified by the current pointer each time the mobile device plays the audio file.

26. A mobile device comprising:
a memory configured to store an audio file; and
a multi-media processor comprising:
an audio utility configured to:
store a set of one or more pointers corresponding to one or more user-selected start positions for the audio file; and
randomly select one of the pointers from the set of pointers as a current pointer each time the mobile device plays the audio file; and
an audio processor configured to play the audio file from a start position identified by the current pointer each time the mobile device plays the audio file.

* * * * *